United States Patent
Wang et al.

(10) Patent No.: US 10,169,422 B2
(45) Date of Patent: Jan. 1, 2019

(54) METHOD AND DEVICE FOR DISPLAYING PROCESS INFORMATION

(71) Applicant: Tencent Technology (Shenzhen) Company Limited, Shenzhen (CN)

(72) Inventors: Qing Wang, Shenzhen (CN); Haoran Guo, Shenzhen (CN); Quanhao Xiao, Shenzhen (CN); Yixia Yuan, Shenzhen (CN); Xunchang Zhan, Shenzhen (CN); Chunyou Lin, Shenzhen (CN); Pengtao Li, Shenzhen (CN); Jiashun Song, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 1032 days.

(21) Appl. No.: 13/958,440

(22) Filed: Aug. 2, 2013

(65) Prior Publication Data
US 2014/0032559 A1    Jan. 30, 2014

Related U.S. Application Data

(63) Continuation of application No. PCT/CN2013/079308, filed on Jul. 12, 2013.

(30) Foreign Application Priority Data

Jul. 20, 2012  (CN) .......................... 2012 1 0252505

(51) Int. Cl.
*G06F 17/30* (2006.01)
*G06F 11/30* (2006.01)
(Continued)

(52) U.S. Cl.
CPC ...... *G06F 17/3053* (2013.01); *G06F 11/3003* (2013.01); *G06F 11/32* (2013.01); *G06F 11/3409* (2013.01); *G06F 2201/865* (2013.01)

(58) Field of Classification Search
None
See application file for complete search history.

(56) References Cited

U.S. PATENT DOCUMENTS

2008/0114709 A1* 5/2008 Dixon .................... G06Q 10/06
706/13
2010/0058120 A1   3/2010 Coleman et al.

FOREIGN PATENT DOCUMENTS

CN        1588323 A     3/2005
CN      101436146 A     5/2009
(Continued)

OTHER PUBLICATIONS

Steven Sinofsky, The Windows 8 Task Manager, Oct. 13, 2011, [Retrieved Sep. 8, 2015] Retrieved from the Internet: <URL: https://blogs.msdn.microsoft.com/b8/2011/10/13/the-windows-8-task-manager>.*

(Continued)

*Primary Examiner* — Kenneth M Lo
*Assistant Examiner* — Istiaque Ahmed
(74) *Attorney, Agent, or Firm* — Morgan, Lewis & Bockius LLP

(57) ABSTRACT

The present invention discloses a method and a device for displaying process information, which belongs to the field of computer technologies. The method may include: scanning a memory of a device for running processes; categorizing and ranking the scanned running processes according to a preset process display format; and displaying each process category after categorization and running processes within each process category, and displaying information related to the process category and the running processes within the (Continued)

process category; and/or displaying ranked running processes, and displaying related information corresponding to the ranked running processes. In the present invention, by presetting a process categorization format, the processes are displayed according to categorization and ranking when a user views the process information, thereby improving the user's understanding of the running processes in the device, making the management of the running processes more efficient, and further enhancing the security of the system.

19 Claims, 12 Drawing Sheets

(51) Int. Cl.
*G06F 11/32* (2006.01)
*G06F 11/34* (2006.01)

(56) References Cited

FOREIGN PATENT DOCUMENTS

| CN | 101887383 A | 11/2010 |
|----|-------------|---------|
| CN | 101944167 A | 1/2011 |
| CN | 102053999 A | 5/2011 |
| CN | 102521099 A | 6/2012 |
| JP | 2008059515 A | 3/2008 |
| JP | 2012-089041 | 10/2012 |
| WO | WO 2011017155 A1 | 2/2011 |

OTHER PUBLICATIONS

AnVir Task Manager, Jul. 19, 2011, [retrieved on Aug. 29, 2016], Retrieved from the Internet: <URL: https://web.archive.org/web/20110719100450/http://www.anvir.com/AnVirTaskManager.doc>.*

Security Task Manager, Dec. 14, 2010, [retrieved on Nov. 11, 2017], Retrieved from the Internet: <URL: https://web.archive.org/web/20101214090236/http://neuber.com/taskmanager/SecurityTaskManager_Manual.pdf>.*

David Feinzeig, How to fix "Camera Failed" error on Samsung Galaxy S II (or other Samsung Android devices), May 23, 2012, Retrieved from the Internet: <URL: http://david.feinzeig.com/blog/2012/05/23/how-to-fix-camera-failed-error-on-samsung-galaxy-s-ii-or-other-samsung-android-devices/> (Year: 2012).*

WiseUser, Kill Process before installing and Uninstalling a application, Mar. 17, 2009, Retrieved from the Internet: <URL: https://www.symantec.com/connect/blogs/kill-process-installing-and-uninstalling-application> (Year: 2009).*

Tencent Technology, ISRWO, PCT/CN2013/0790308, Oct. 17, 2013 9 pgs.

Tencent Technology, IPRP, PCT/CN2013/0790308, Jan. 20, 2015, 7 pgs.

* cited by examiner

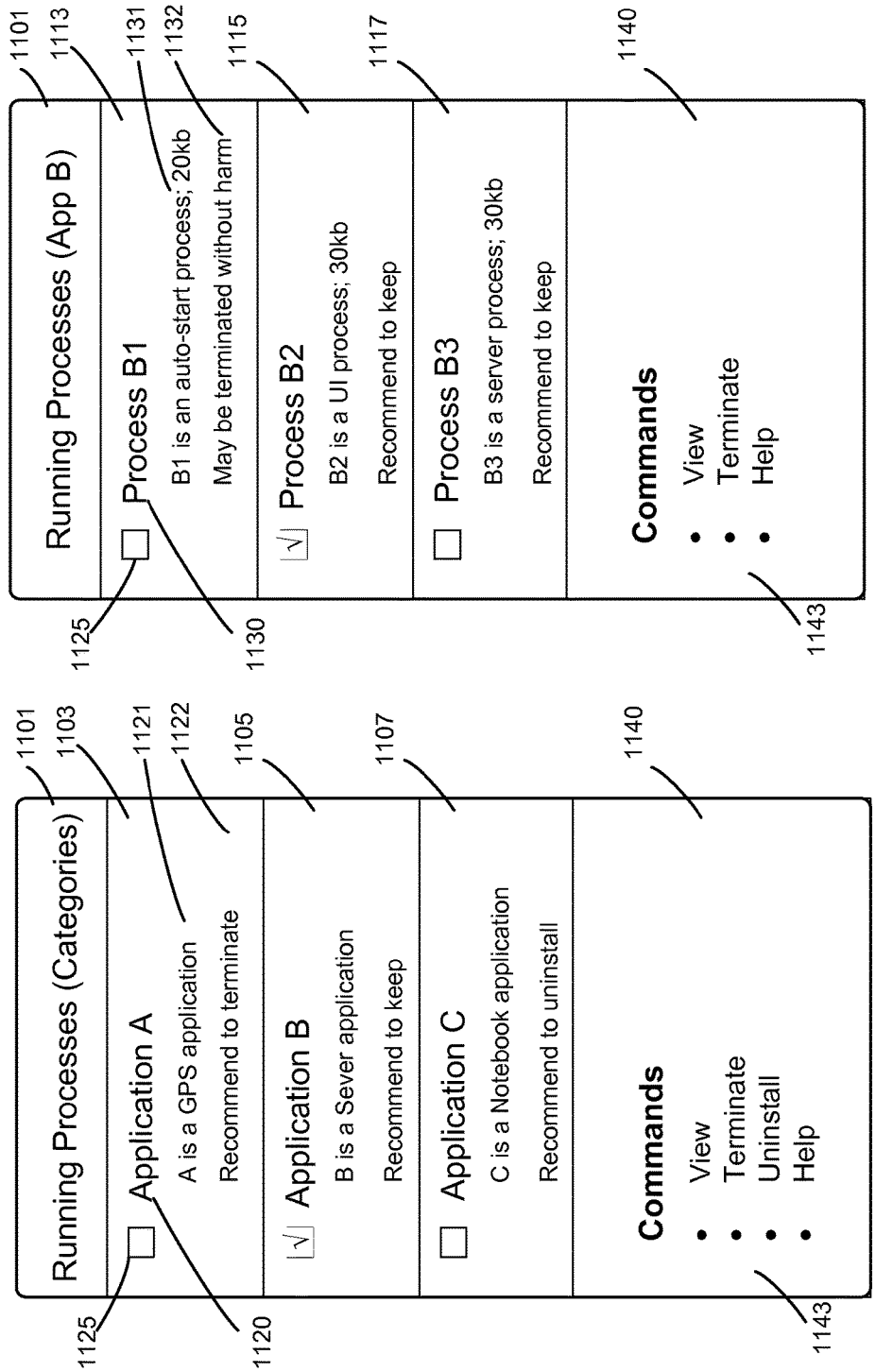

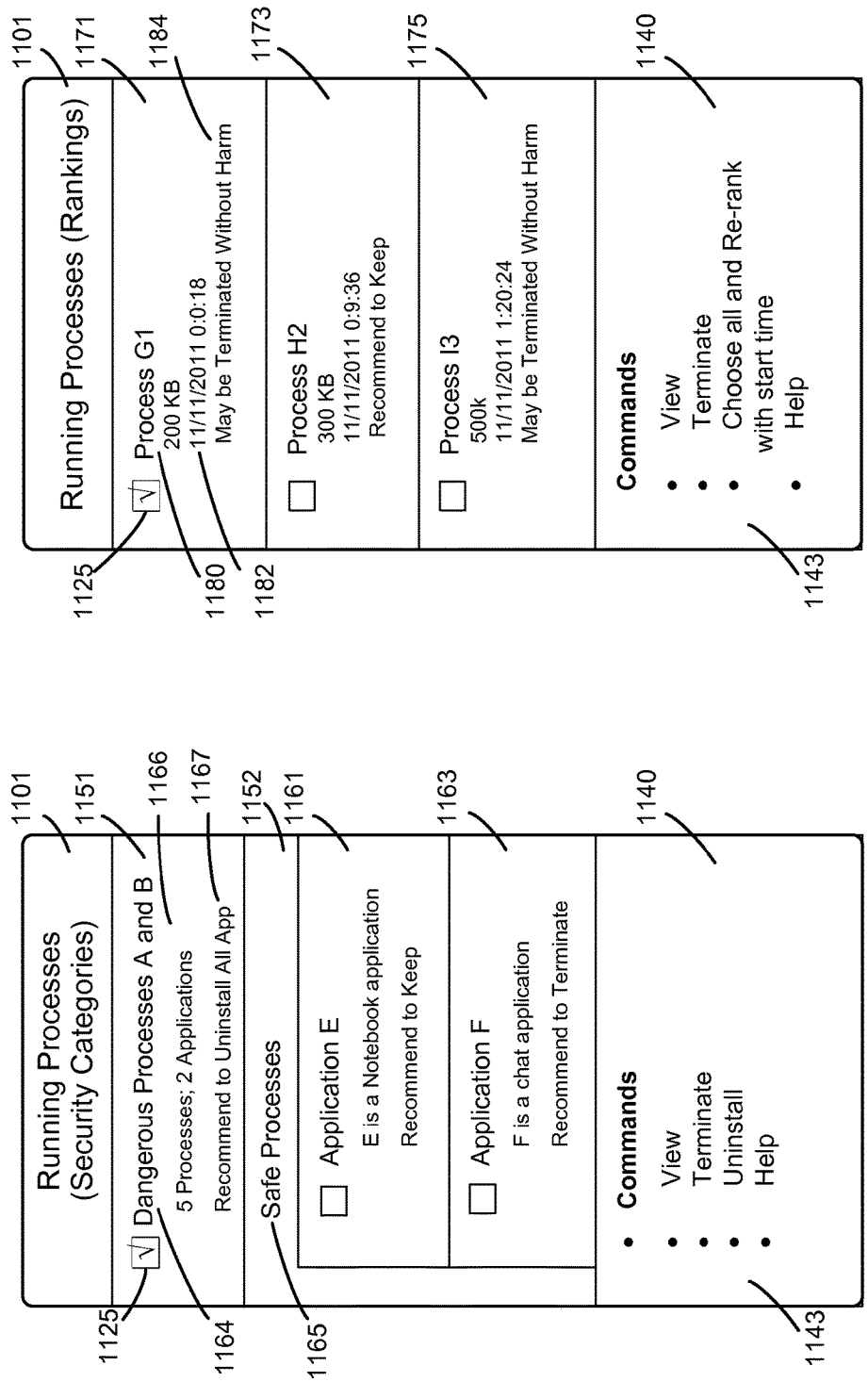

METHOD AND DEVICE FOR DISPLAYING PROCESS INFORMATION

RELATED APPLICATIONS

This application is a continuation application of PCT Patent Application No. PCT/CN2013/079308, entitled "METHOD AND DEVICE FOR DISPLAYING PROCESS INFORMATION", filed on Jul. 12, 2013, which claims priority to Chinese Patent Application No. 201210252505.8, entitled "METHOD AND DEVICE FOR DISPLAYING PROCESS INFORMATION", filed on Jul. 20, 2012, both of which are incorporated by reference in their entirety.

TECHNICAL FIELD

The disclosed implementations relate generally to the field of computer technologies, and in particular, to a method and a device for displaying process information.

BACKGROUND

With the development of mobile devices, more and more applications developed for mobile devices gain popularity in people's work and study. Each application is completed through one or more processes. A process is a dynamic execution procedure applied in a specific data set, and is a unit for system resource allocation and management. The management and execution of the processes are accompanied by the consumption of resources such as processor capacity. The number of processes and the size of processes in the system of the mobile device have direct influence on the running speed of the system.

In the existing technology, a method that is provided by the mobile device for a user to display running processes in the device is as follows: the running processes of the mobile device are scanned, a list of processes that currently reside in the memory is acquired, and the list is displayed to the user. Further, the user can select to view or terminate a certain process.

During the implementation of the present invention, the inventors find that the existing technology has at least the following disadvantages:

The user cannot know, according to the list of the processes, which application each process belongs to or whether it is necessary to terminate the process, and therefore, it is quite difficult for the user to filter out the processes that can be terminated, thereby easily causing a normal running process to be terminated by mistake and even resulting in crash of the system and/or data loss.

SUMMARY OF THE INVENTION

In order to solve the problem in the existing technology that a user cannot obtain detailed contents when the user tries to view the process information, embodiments of the present invention provide a method and a device for displaying process information. The invention may include the following aspects and implementations.

In one aspect, a method for displaying process information is provided, where the method may include:
scanning a memory for running processes;
categorizing and ranking the scanned running processes according to a preset process display format; and
displaying each process category after categorization and running processes within the process category, further including displaying information related to the process category and the running processes within the process category and displaying the ranked processes and information related to the ranked processes.

The step of categorizing the scanned running processes according to the preset process display format may include:
acquiring process information of each running process, and obtaining an application identifier in the process information to categorize the running process according to a rule of grouping running processes having the same application identifier into one category; or
acquiring process information of each running process, obtaining corresponding security evaluation by searching a preset process information feature database according to the process information, and categorizing the running process according to the security evaluation. In particular, the step of categorizing the running process according to the safety evaluation may comprise classifying the running process into a safe process or a dangerous process.

The step of ranking the scanned running processes according to the preset process display format may include:
acquiring process information of the scanned running processes, and ranking the running processes according to startup time in the process information; or
acquiring process information of the scanned running processes, and ranking the running processes according to the size of an occupied memory in the process information.

The step of the step of displaying each process category after categorization and the running processes within the process category, and displaying information related to process category and the running processes within the process category may include:
acquiring suggestion information corresponding to the process category after categorization;
acquiring process information corresponding to the running processes within the process category after categorization, extracting description information of the running processes from the process information, and obtaining suggestion information corresponding to the running processes by searching a preset process information feature database according to the process information; and
displaying the process category after categorization and the suggestion information corresponding to the process category, and displaying, in a process list corresponding to the process category, running processes within the process category, and suggestion information corresponding to the process and/or description information corresponding to the running processes.

The suggestion information for the process category may be acquired from the preset process information features database or from other sources.

The step of acquiring the suggestion information corresponding to each process category after categorization may include:
acquiring an application identifier corresponding to the process category after categorization, and obtaining, by searching the preset process information feature database according to the application identifier, suggestion information corresponding to the process category.

The step of displaying the ranked running processes, and displaying the information related to the ranked running processes may include:
acquiring process information corresponding to each ranked running process, and extracting description information corresponding to the running process from the process information;
obtaining suggestion information corresponding to the process by searching a preset process information feature database according to the process information corresponding to each ranked running process; and displaying the ranked running processes, and suggestion information corresponding to the processes and/or description information corresponding to the running processes.

After the step of displaying each process category after categorization and the running processes within each process category, the method may further include:

receiving an operation command of a user for the process category or running processes within the process category, and executing a corresponding operation on an application corresponding to the process category or on the running processes within the process category according to the operation command.

After the displaying the ranked running processes, and displaying the related information corresponding to the ranked running processes, the method may further include:

receiving an operation command of a user for the ranked running processes, and executing a corresponding operation on the running processes according to the operation command.

In another aspect, a computing device for displaying process information is provided, where the device may include:

one or more processors;

memory; and one or more modules stored in the memory to be executed by the one or more processors, the one or more modules further including:

a scanning module, configured to scan a memory for running processes;

a processing module, configured to categorize and rank the scanned running processes according to a preset process display format; and a displaying module, configured to display each process category after categorization and running processes within the process category, further including displaying information related to the process category and the running processes within the process category and displaying the ranked processes and information related to the ranked processes.

The processing module may include:

a first categorization unit, configured to acquire process information of each running process, and acquire an application identifier in the process information to categorize the scanned running processes according to a rule of grouping running processes having the same application identifier into one category; and a second categorization unit, configured to acquire process information of each running process, obtain corresponding security evaluation by searching a preset process information feature database according to the process information, and categorize the running processes according to the safety evaluations. In particular, the second categorizing unit is configured to categorize each running process as a safe process or a dangerous process.

The processing module may include:

a first ranking unit, configured to acquire process information of the scanned running processes, and rank the running processes according to startup time in the process information; and a second ranking unit, configured to acquire process information of the scanned running processes, and rank the running processes according to the size of occupied memory in the process information.

The displaying module may include:

a first acquisition unit, configured to acquire suggestion information corresponding to each process category after categorization;

a second acquisition unit, configured to acquire process information corresponding to the running processes within each process category after categorization, extract description information of the running processes from the process information, and obtain suggestion information corresponding to the running processes by searching a preset process information feature database according to the process information; and a first displaying unit, configured to display the process category after categorization and the suggestion information corresponding to the process category, and display, in a process list corresponding to the process category, running processes within the process category, and suggestion information corresponding to the running processes and/or description information corresponding to the running processes.

The first acquisition unit may include:

a first acquisition sub-unit, configured to acquire an application identifier corresponding to each process category after categorization; and a second acquisition sub-unit, configured to obtain, by searching the preset process information feature database according to the application identifier, suggestion information corresponding to the process category.

The displaying module may include:

a third acquisition unit, configured to acquire process information corresponding to each ranked running process, and extract description information corresponding to the running process from the process information;

a fourth acquisition unit, configured to obtain suggestion information corresponding to the running process by searching a preset process information feature database according to the process information corresponding to each ranked running process; and a second displaying unit, configured to display the ranked running processes, and suggestion information corresponding to the running processes and/or description information corresponding to the running processes.

The device may further include:

a first receiving module, configured to receive an operation command of a user for the process category or running processes within the process category, and execute a corresponding operation on an application corresponding to the process category or on the running processes within the process category according to the operation command.

The device may further include:

a second receiving module, configured to receive an operation command of a user for the ranked running processes, and execute a corresponding operation on the running processes according to the operation command.

Beneficial results of the technical solutions according to the embodiments of the present invention may include at least the following:

By presetting a process categorization format, the processes are displayed according to categorization when the user views the process information, thereby improving the user's understanding of the running processes in the device, making the management of the running processes more efficient, and further enhancing the security of the system.

BRIEF DESCRIPTION OF DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

To describe the technical solutions in the embodiments of the present invention more clearly, the following briefly introduces the accompanying drawings required for describing the embodiments. Apparently, the accompanying drawings in the following descriptions show merely some embodiments of the present invention, and persons of ordinary skill in the art may still derive other drawings and embodiments from the accompanying drawings without creative efforts.

FIGS. 11A-D are exemplary screenshots of how a mobile terminal displays process categories and running processes in accordance with some implementations.

DETAILED DESCRIPTION

In order to make the objectives, technical solutions and advantages of the present invention clearer, the embodiments of the present invention are described in detail in the following with reference to the accompanying drawings. Some features and steps for a particular embodiment may be adopted by another embodiment. As long as the description for a certain feature of a particular embodiment does not directly contradict with the description and/or feasibility for another embodiment, the feature may be considered optionally included in the other embodiment.

Example 1

Figure 1:
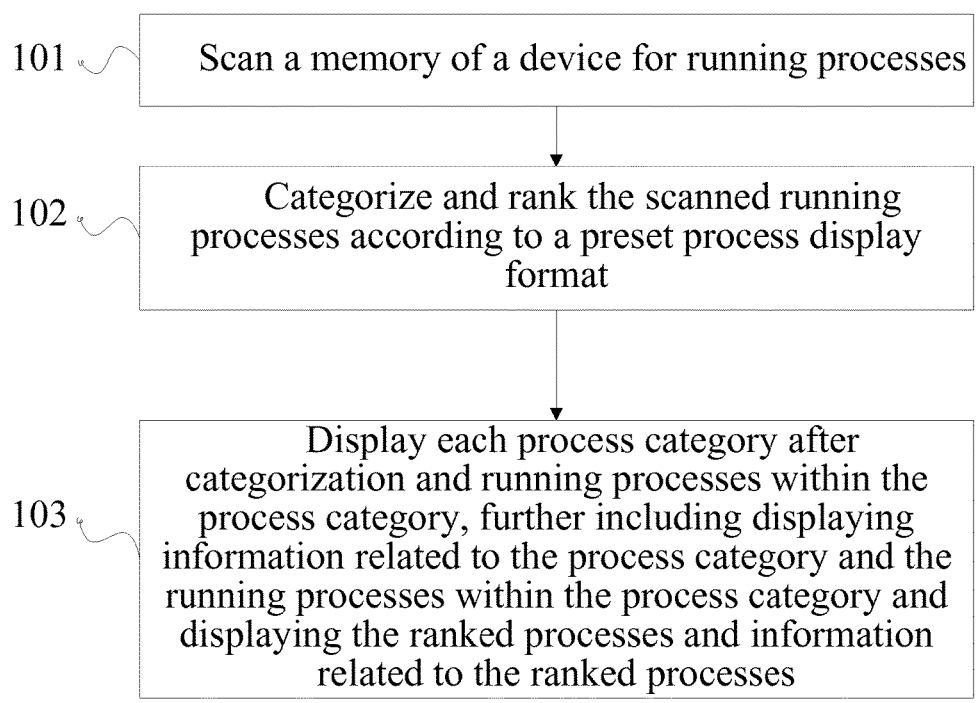
FIG. 1 is a schematic flowchart of a method for displaying process information in accordance with some implementations of the present invention.

An example of the present invention provides a method for displaying process information. Referring to FIG. 1, the method may include:

101: Scan a memory for running processes.

102: Categorize and rank the scanned running processes according to a preset process display format.

103: Display each process category after categorization and running processes within the process category, further including displaying information related to the process category and the running processes within the process category and displaying the ranked processes and information related to the ranked processes.

In the example of the present invention, by a preset process categorization format, the processes are displayed according to categorization when the user views the process information, thereby implementing understanding of the user for the processes currently running in the device, improving management efficiency of the user on the processes, and further improving security of the system.

It should be noted that though categorization and ranking may be conducted separately, they are not mutually exclusive. The method may include steps that categorize the running processes first, before ranking the running processes in each category according to certain criteria. Alternatively, the method may include steps that rank the running processes first, before categorization of the ranked running processes.

The related information of the process categories may include but not be limited to: the general description of the category (description information for the category, e.g. name of the category, the categorization criteria, the usage of the category, etc), the risk evaluation of the category, the recommended action for the category (suggestion information for the category), and any combinations thereof. The related information of the running processes may include but not limited to the general description of the process (description information for the running process, e.g. name of the running process, the running time of the process, the memory occupancy of the process, the usage of the process, etc), application identifiers for the running process, which provides guidance as to which application the running process belongs to; the ranked position of the process, the risk evaluation of the process, the recommended actions for the process (suggestion information for the running process), and any combinations thereof. The related information for the process categories may partially overlap with the related information for the running processes. Each information item for the process category and for the running process may also partially overlap.

The preset process display format provides guidance to both categorization/ranking and display of the running processes and the related information of the process categories and the running processes. The user may set the preset process display format before categorization/ranking is conducted and before the results are displayed. The preset process display format may include all or part of the information items of the related information, as well as other information items needed for better characterization and presentation of the running processes. The preset process display format may also set how the information items are displayed by the device.

Example 2

Figure 2:
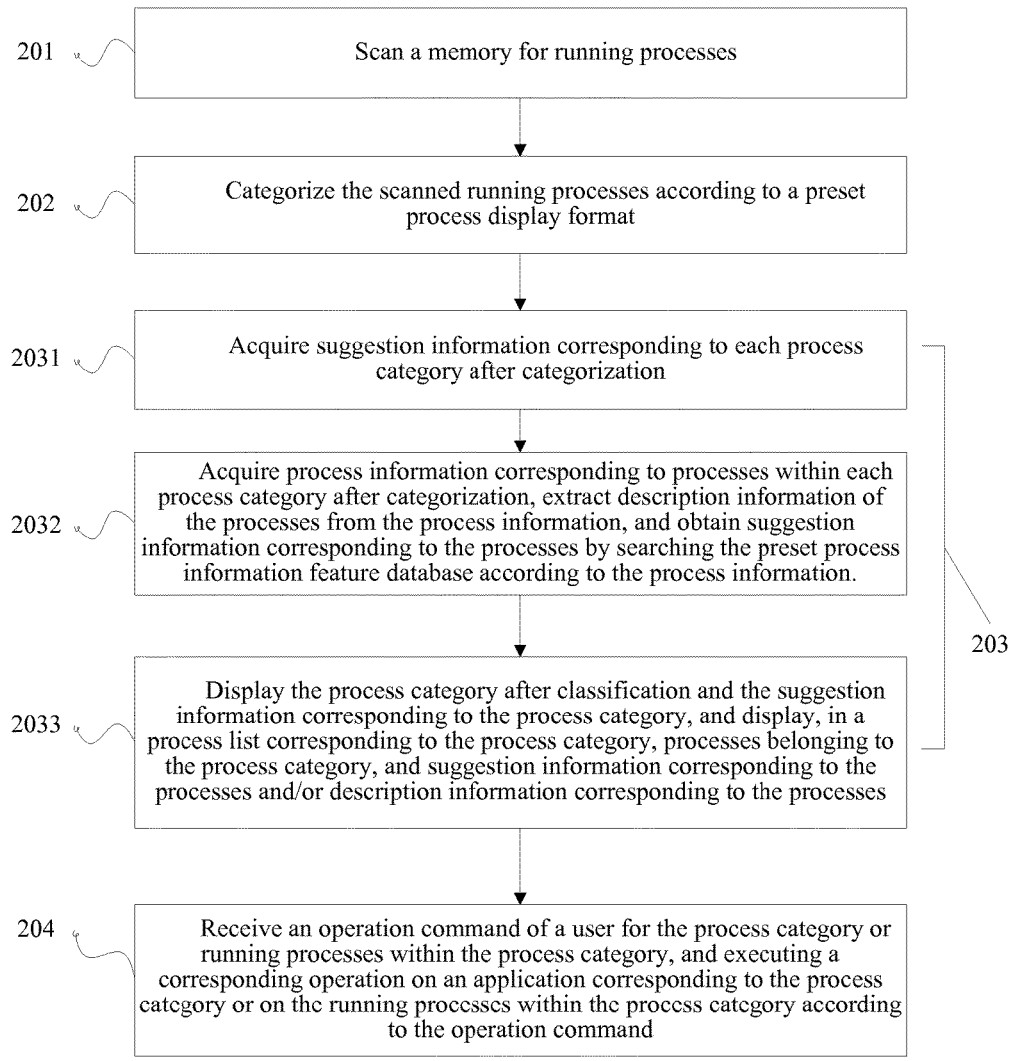
FIG. 2 is a schematic flowchart of a method for displaying process information in accordance with some implementations of the present invention.

An example of the present invention provides a method for displaying process information. Referring to FIG. 2, the method may include:

201: Scan a memory for running processes.

202: Categorize the scanned running processes according to a preset process display format.

The current example shows how categorization is conducted according to application (software) to which each running process belongs. In particular, the method may include:

acquiring process information of each running process, and obtaining an application identifier in the process information to categorize the running processes according to a rule of grouping running processes having the same application identifier into one category.

Process information includes at least some information pertinent or relevant to the process, allowing direct display or further search of other information that is related to the process. For example, the process information may include at least the description information for the process and application identifier for the process. Process information may overlap, not at all or in part or in entirety, with the related information of the process that is to be displayed.

One application (software) may run one or a plurality of processes simultaneously. For example, a certain application may include two processes, namely, a user interface process and a backend server process, which are used for implementing different functions. Therefore, when the user selects to categorize the running processes according to the applications, the running processes belonging to the same application are grouped into one category; so in this particular case, the user interface process and the backend server processes are grouped together. When this category is viewed, all running processes started by the same applications corresponding to the category are displayed accordingly.

Each process carries process information, and the process information may include a corresponding application identifier (UID), and therefore categories corresponding to running processes in a memory can be identified according to the application identifier. This is an example for a basic categorization of the processes.

203: Display each process category after categorization and running processes within the process category, and display information related to the process category and the running processes within the process category.

When a process categorization format by the user is to categorize the running processes according to the application, running processes are displayed separately according to application categories after categorization. During displaying, suggestion information corresponding to the categorization category and to the running processes in each category may be displayed simultaneously, so that the user understands the function of the application and related suggestion information.

Therefore, step 203 may specifically include:

2031: Acquiring suggestion information corresponding to each process category after categorization.

Specifically, when the processes are categorized according to the application to which the process belongs to, an application identifier corresponding to each process category after categorization is acquired, and matching is performed based on the application identifier in a preset process information feature database to acquire suggestion information corresponding to the application identifier, and the suggestion information is taken as suggestion information of a category corresponding to the application identifier. After the acquisition, the suggestion information may be incorporated into the related information for the category and may be displayed according to the preset display format.

Matching is performed based on the application identifier in the pre-stored process information feature database, wherein the process information feature database may pre-store a historical experience database obtained through historical verification or user feedback, and may also include suggestion information of the application. The suggestion information may include at least the operation suggestions obtained through summary and analysis according to usage of the application and the security thereof. For example, a certain application may be an address book management application; corresponding suggestion information of the application in the process information feature database may "Reservation is suggested, and this application is an address book management application" or any abbreviations thereof, so as to illustrate to the user the function of the application and the operation status in the device. When categorization is based on application identifiers, the running processes may be categorized and displayed based on the applications each running process belongs to, and the suggestion information for the category is the suggestion information for the application.

2032: Acquire process information corresponding to processes within each process category after categorization, extract description information of the processes from the process information, and obtain suggestion information corresponding to the processes by searching the preset process information feature database according to the process information.

Description information in the process information is acquired according to the process information corresponding to processes within each process category after categorization, where the description information may include: startup time of a current process, the size of a memory occupied by the current process, file path, and description of specific usage of the current process in the application. For example, description information of a certain process A1.exe may include: startup time: Nov. 11, 2011; occupied memory: 20 Kb; and description of the usage: a background server process.

Suggestion information corresponding to the process is acquired in the preset process information feature database according to the process information, where the specific content of the suggestion information is a specific operation suggestion for the process, and may be suggestion information such as "Reservation is suggested" or "Termination is suggested".

2033: Display the process categories after categorization and the suggestion information corresponding to each process category, and displaying, in a process list corresponding to the process category, running processes within the process category, and suggestion information corresponding to the running processes and/or description information corresponding to the running processes.

For example, two applications, namely an address book management application and a short message application of the system, are currently running in the memory, then the user may choose to categorize the running processes according to the application to which the processes belong. In this case, the categories are the address book management application and the short message application of the system, and the categories are first displayed in the list, and the user can perform a specific operation on an application name corresponding to the category by using an operation command. When an operation of viewing is performed on the category, the list of all processes corresponding to the application can be displayed, and suggestion information and/or description information corresponding to each process may be displayed simultaneously.

204: Receiving an operation command of a user for the process category or running processes within the process category, and executing a corresponding operation on an application corresponding to the process category or on the running processes within the process category according to the operation command.

In particular, when an operation command directed to a category is received, the user may choose to:

1. view, where if an application item (category) is selected, a sub-view is entered, and description information of the application is viewed, displaying at least the running processes of the application;

2. terminate, where all processes or a part of the processes belonging to the application may be terminated in a one-click or two-click manner;

3. uninstall, where if the user confirms that a certain category (application) is not needed any more, the user can select to uninstall the application in an one-click or two-click manner, and in this action, the application is uninstalled automatically after all processes of the application are terminated, so as to provide convenient management of the application from a process level; and 4. mark/unmark choices may be provided for view, termination, and/or uninstalling to indicate selection of certain category (application) for the operation, allowing the user to conveniently manage a plurality of categories (applications) simultaneously.

When an operation command for a specific process in the process list of the category is received, the user may choose to:

1. view, where process information of a certain running process is shown, such as a file path, startup time and other detailed properties of the process;

2. terminate, where a certain running process is terminated in a one-click or two-click manner, influence on other processes having the same program is determined, and the process is terminated after security confirmation; and 3. mark/unmark choices may be provided for view, termination, and/or uninstalling to indicate selection of certain running process for the operation, allowing the user to conveniently manage a plurality of running processes simultaneously.

mark/unmark choices may be provided for view and/or termination to indicate selection of a certain running process for the operation, allowing the user to conveniently manage a plurality of running processes simultaneously.

Step 204 provides a number of commands that may be executed for the processes and process categories. However, other commands may also be included and the manner of presenting the commands to the user may also be altered. For example, commands such as "find similar application" and "check for update" may be included for the process category commands; for the running processes, the user may choose to "display more details." The specific commands to be presented to a user may be set by the user by change default settings of a process management software.

In the example of the present invention, by presetting how a running process may be categorized and ranked, the running processes may be displayed according to categorization and ranking when the user views the process information, thereby implementing understanding of the user for the processes currently running in the device, improving management efficiency of the running processes by the user, and further improving security of the system.

Example 3

Figure 3:
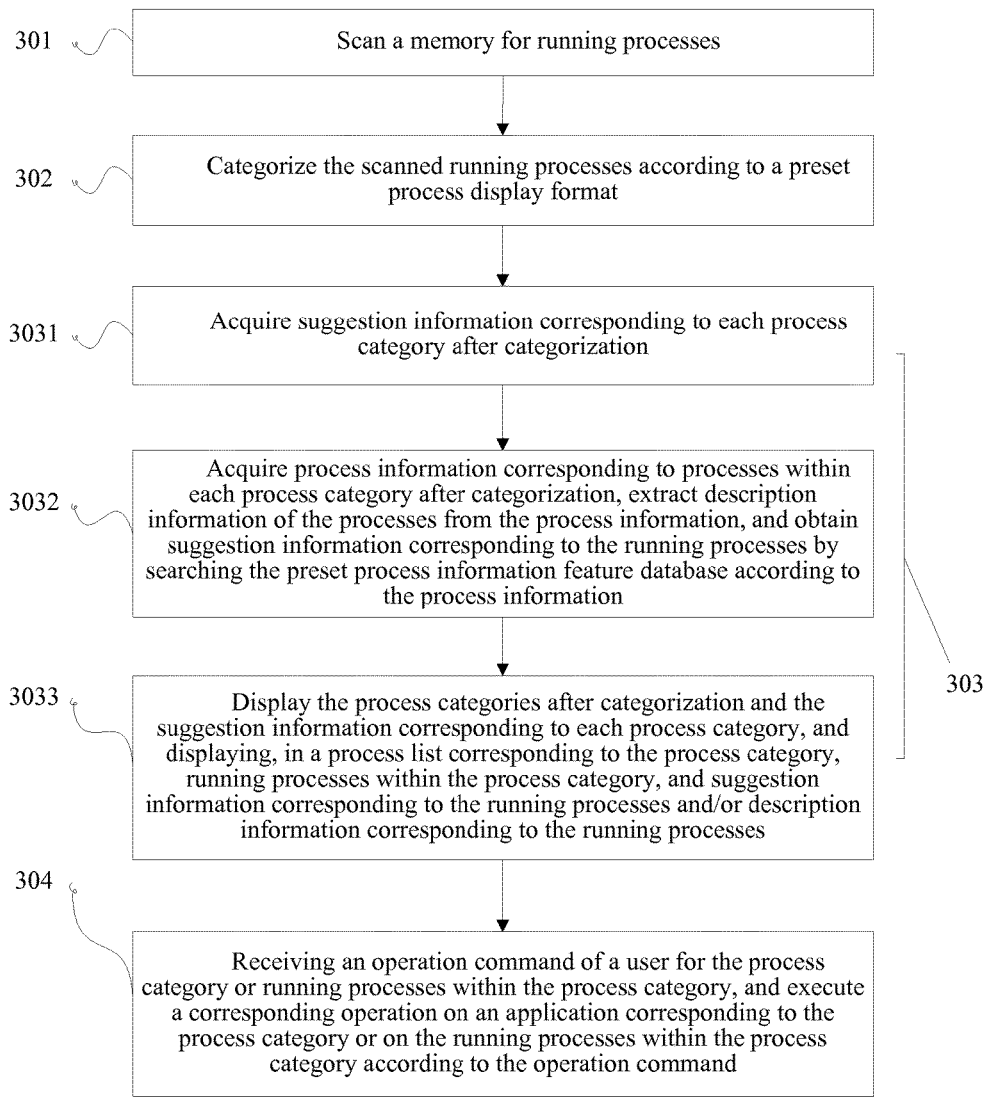
FIG. 3 is a schematic structural diagram of a method for displaying process information in accordance with some implementations of the present invention.

An example of the present invention provides a method for displaying process information. Referring to FIG. 3, it should be noted that detailed description of some steps in this example is the same as that of the steps in Example 2, and will not be fully described in this example to avoid redundancy.

The method may include:

301: Scan a memory for running processes.

302: Categorize the scanned running processes according to a preset process display format.

In the current embodiment of the present invention, the running processes may be categorized according to security evaluation of the running process. In particular, the categorization of the running processes may include:

acquiring process information of each running process, and obtaining corresponding security evaluation by searching a preset process information feature database according to the process information, so as to categorize the scanned running processes, wherein the step of categorizing the running processes may include classifying each running process as a safe process or a dangerous process.

The security evaluation of a running process may include information and estimates regarding a number of aspects related to the impact of the running processes on the security of data and device. The security evaluation may cover not only whether the running process is dangerous to the system when it is running, but also whether terminating the running process may adversely impact the stability and safety of the system. In some embodiments, the security evaluation specifically refers to the evaluation of the running processes on the device and data when the running processes are running. Categorization based on security evaluation may involve dividing the running processes into two basic groups: dangerous and safe. However, in some embodiments, categorization may result in a more detailed grouping of running process, e.g. devastating; very dangerous; dangerous; minor risk; and safe. The specific categorization criteria may be set by the process display software or may be set or refined by the user.

In particular, in some embodiments like what is shown in FIG. 3, whether a process corresponding to the process information is a dangerous process is queried in a preset process information feature database according to the process information, wherein the dangerous process may include: a virus or Trojan horse process, and various processes that threaten the system security or disclose user information. If the standard of the dangerous process is satisfied, the process corresponding to the process information is grouped into the category of dangerous processes; otherwise it is grouped in the category of safe processes.

In this embodiment, the processes are grouped into two categories, including the category of dangerous processes and a category of safe processes. Preferably, the safe processes may be displayed separately according to the application identifier thereof, so that the user may further know and understand each application.

A process belonging to the dangerous processes may be associated with the category of dangerous processes, a process belonging to the safe processes may be associated with an application identifier corresponding to the process; and each secure application identifier may be used to sub-categorize the safe running processes.

303: Display each process category after categorization and processes within each process category, and display related information of each running process category and of the running processes within each process category.

Step 303 specifically may be:

3031: Acquire suggestion information corresponding to each process category after categorization.

Specifically, when the running processes are categorized according to the security evaluations of the processes, for the category of dangerous processes, preset suggestion information corresponding to the category of dangerous processes is taken as suggestion information of the category of dangerous processes; for the category of safe processes, matching is performed based on an application identifier corresponding to the category of each safe running process in a preset process information feature database to acquire suggestion information corresponding to the application identifier, and the suggestion information is taken as suggestion information of the category corresponding to the application identifier.

Suggestion information corresponding to the category after categorization may be obtained; when the running process is a dangerous process (categorized in the dangerous process category), preset suggestion information about the dangerous processes is directly obtained; and the suggestion information may be "Termination is suggested, and it is a virus or Trojan horse application". Alternatively, when the running process is categorized as a dangerous process, it may still be sub-categorized according to the application identifiers. The suggestion information for the categories of dangerous processes may be the same (as shown about) or different. When the running process is a safe process, the running process is subcategorized according to the application identifier of the process. For example, when the running process belongs to a certain application that is an address book management application, corresponding suggestion information of the application in the process information feature database may be "Reservation is suggested, and this application is an address book management application", so as to show the user the function of the application and the operation evaluation in the device.

3032: Acquire process information corresponding to processes within each process category after categorization, extract description information of the processes from the process information, and obtain suggestion information corresponding to the running processes by searching the preset process information feature database according to the process information.

3033: Display the process categories after categorization and the suggestion information corresponding to each process category, and displaying, in a process list corresponding to the process category, running processes within the process category, and suggestion information corresponding to the running processes and/or description information corresponding to the running processes.

304: Receive an operation command of a user for the process category or running processes within the process category, and executing a corresponding operation on an application corresponding to the process category or on the running processes within the process category according to the operation command.

In particular, when an operation command directed to the category of dangerous processes is received, the user may choose to:

1. view, where if a record of the dangerous process is selected, the process information of the dangerous process may be viewed;

2. terminate, where the dangerous process is terminated in a one-click or two click manner, so as to rapidly decrease running risk of the device, such as mobile phone;

3. uninstall, where application information to which the dangerous process belongs is recorded, after the process is terminated in a one-click or two-click manner, the malicious software to which the dangerous application belongs is uninstalled, so as to thoroughly eliminate the running risk of the device and improve the security level of the device such as a mobile phone; and 4. mark/unmark choices may be provided for view, termination, and/or uninstalling, indicate selection of certain categories (applications) for the operation, allowing the user to conveniently manage a plurality of categories (applications) simultaneously.

The operation command for the category of safe processes and the operation command when a specific running process in the process list of the category of safe processes may be the same as step 204.

In the example of the present invention, by presetting how a running process may be categorized and ranked, the running processes may be displayed according to categorization and ranking when the user views the process information, thereby implementing understanding of the user for the processes currently running in the device, improving management efficiency of the running processes by the user, and further improving security of the system.

Example 4

Figure 4:
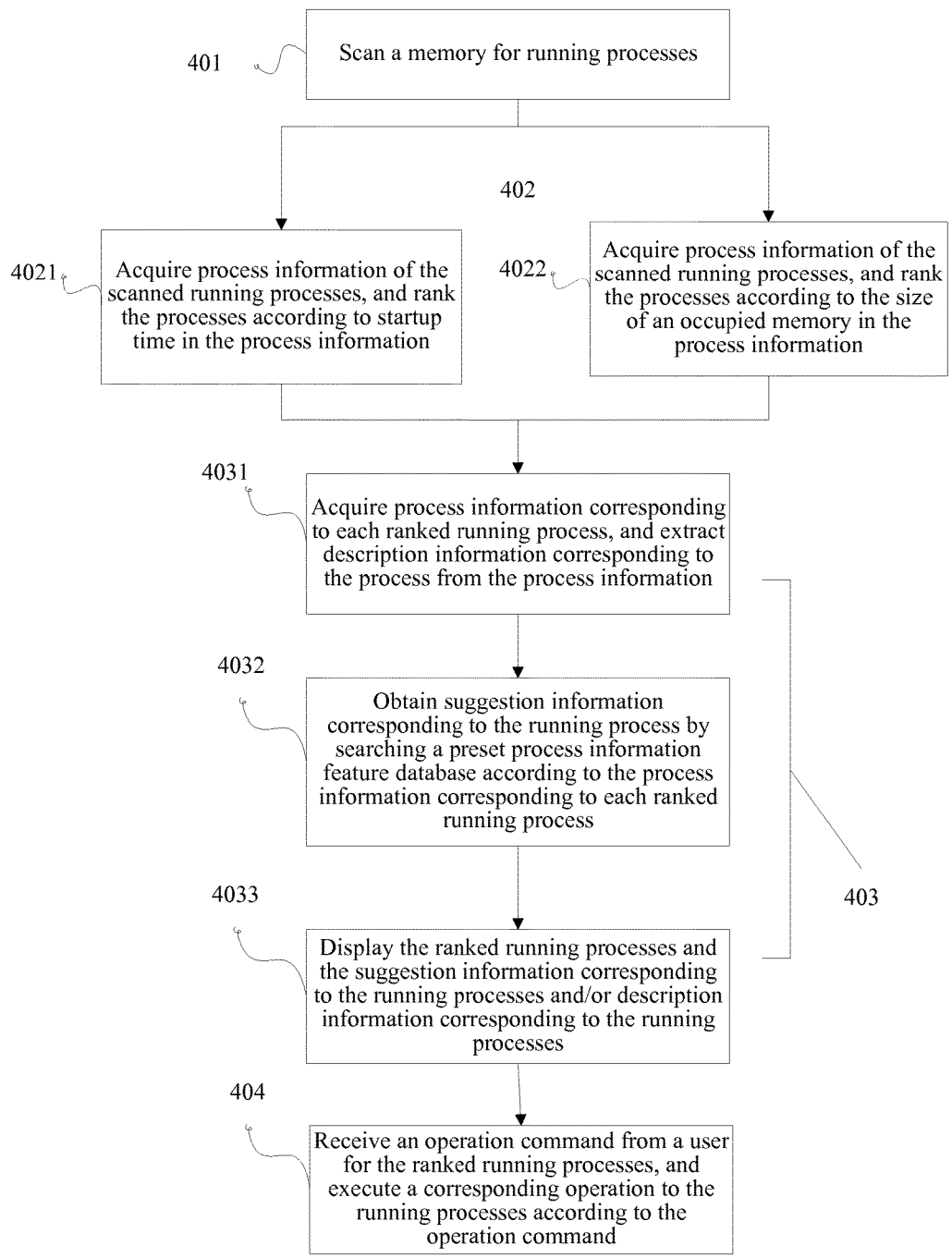
FIG. 4 is a schematic structural diagram of a method for displaying process information in accordance with some implementations of the present invention.

An example of the present invention provides a method for displaying process information. Referring to FIG. 4, it should be noted that detailed description of some steps in this example is the same as that of the steps in Examples 2 and/or 3, and will not be described fully in this example to avoid redundancy.

The method may include:

401: Scan a memory for running processes.

402: Rank the scanned running processes according to a preset process display format.

In the example of the present invention, ranking may be conducted according to the startup time of the running processes or the size of a memory occupied by the running process, and therefore step 402 of ranking the running processes specifically may be:

When the ranking criterion is the startup time of the running process:

4021: Acquire process information of the scanned running processes, and rank the processes according to startup time in the process information.

When the ranking criterion is the size of the memory occupied by the process:

4022: Acquire process information of the scanned running processes, and rank the processes according to the size of an occupied memory in the process information.

It should also be noted that besides the criteria listed in steps 4021 and 4022, many other parameters may be chosen as the ranking criteria for the running processes. For example, the running processes may be ranked according to their security evaluations. A system may be set up to provide "danger scores" to various running processes, wherein the danger score reflect the harm of the running processes to the security of the device and data when they are running and/or the harm of terminating the running processes. The running processes may be ranked according to the "danger score," and the user may take appropriate actions based on the rankings and suggestion information.

403: Display ranked running processes, and display related information corresponding to the ranked running processes.

Step 403 specifically may be:

4031: Acquire process information corresponding to each ranked running process, and extract description information corresponding to the process from the process information.

4032: Obtain suggestion information corresponding to the running process by searching a preset process information feature database according to the process information corresponding to each ranked running process.

4033: Display the ranked running processes and the suggestion information corresponding to the running processes and/or description information corresponding to the running processes.

In this particular embodiment, the running processes are not separated in different categories, and all running processes and suggestion information and/or description information corresponding thereto are directly displayed according to a preset ranking sequence.

Nevertheless, as indicated above, ranking and categorization are not mutually exclusive. The running processes may be first categorized, e.g. with application identifiers, and then ranked in each category; or the running processes may be first ranked, as shown in FIG. 4, and then categorized according to specific criteria such as the application identifiers. The displaying and managing steps from either the categorization and ranking embodiments may also be combined.

404: Receive an operation command from a user for the ranked running processes, and execute a corresponding operation to the running processes according to the operation command.

When an operation command for a specific running process in the process list is received, the user may choose to:

1. view, where process information of a certain running process is shown, such as a file path, startup time and other detailed properties of the process;

2. terminate, where a certain running process is terminated in a one-click or two-click manner, influence on other processes having the same program is determined, and the process is terminated after security confirmation; and 3. mark/unmark choices may be provided for view, termination, and/or uninstalling to indicate selection of certain running process for the operation, allowing the user to conveniently manage a plurality of running processes simultaneously.

In the example of the present invention, by presetting ranking criteria, the processes are ranked and displayed to allow the user to conveniently view the process information, thereby implementing understanding of the user for the processes currently running in the device, improving management efficiency of the user on the processes, and further improving security of the system.

Example 5

Figure 5:
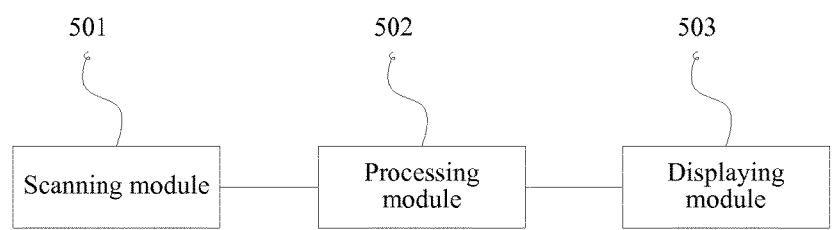
FIG. 5 is a schematic structural diagram of a device for displaying process information in accordance with some implementations of the present invention.

Referring to FIG. 5, an example of the present invention provides an apparatus for displaying process information, where the apparatus may include:

a scanning module 501, configured to scan a memory for running processes;

a processing module 502, configured to categorize and rank the scanned running processes according to a preset process display format; and a displaying module 503, configured to display each process category after categorization and running processes within each process category, and display information related to the process category and the running processes within the process category; or display ranked running processes, and display related information corresponding to the ranked running processes.

In the example of the present invention, by presetting how a running process may be categorized and ranked, the running processes may be displayed according to categorization and ranking when the user views the process information, thereby implementing understanding of the user for the processes currently running in the device, improving management efficiency of the running processes by the user, and further improving security of the system.

Example 6

Figure 6:
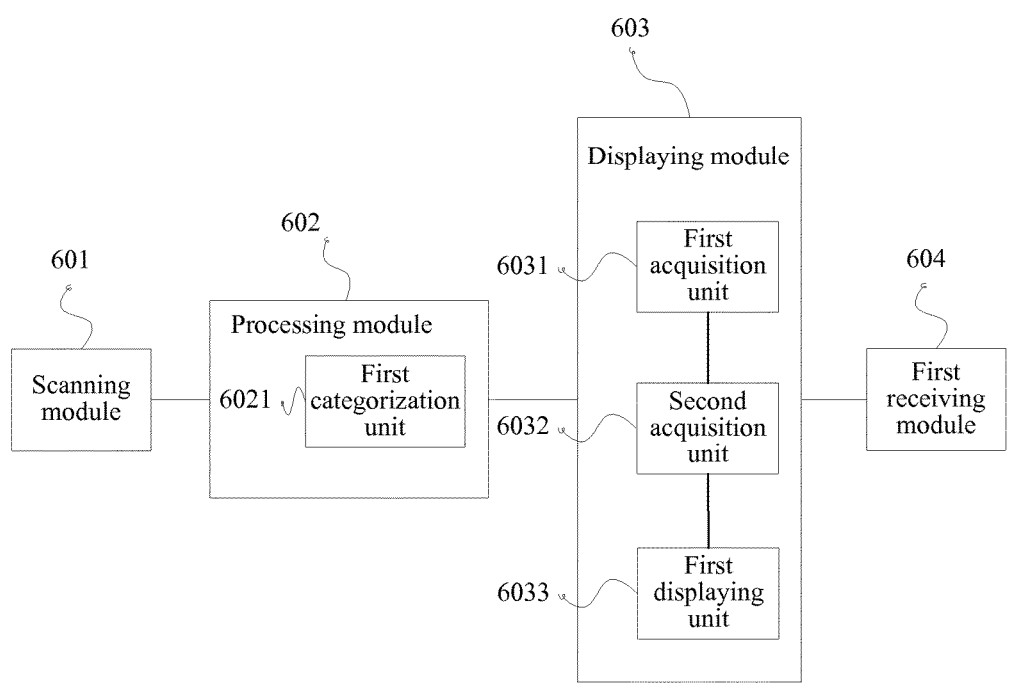
FIG. 6 is a schematic structural diagram of a device for displaying process information in accordance with some implementations of the present invention.

Referring to FIG. 6, an example of the present invention provides an apparatus for displaying process information. It should be noted that a device in the example of the present invention corresponds to the content of the method in Example 2, and the apparatus may include:

a scanning module 601, configured to scan a memory for running processes;

a processing module 602, configured to categorize the scanned running processes according to a preset process display format; and a displaying module 603, configured to display each process category after categorization and running processes within each process category, and display information related to the process category and the running processes within the process category.

In a specific implementations of the present invention, the processing module 602 may include:

a first categorization unit 6021, configured to acquire process information of each running process, and acquire an application identifier of the process information to categorize the scanned running processes according to a rule of grouping running processes having the same application identifier into one category.

The displaying module 603 may include:

a first acquisition unit 6031, configured to acquiring suggestion information corresponding to each process category after categorization;

a second acquisition unit 6032, configured to acquire process information corresponding to processes within each process category after categorization, extract description information of the processes from the process information, and obtain suggestion information corresponding to the processes by searching the preset process information feature database according to the process information; and a first displaying unit 6033, configured to display the process categories after categorization and the suggestion information corresponding to each process category, and displaying, in a process list corresponding to the process category, running processes within the process category, and suggestion information corresponding to the running processes and/or description information corresponding to the running processes.

The first acquisition unit 6031 may include:

a first acquisition sub-unit, configured to acquire an application identifier corresponding to each process category after categorization, and obtain, by searching the preset process information feature database according to the application identifier, corresponding suggestion information as suggestion information of a category corresponding to the process category.

The device may further include:

a first receiving module 604, configured to receive an operation command of a user for the process category or running processes within the process category, and executing a corresponding operation on an application corresponding to the process category or on the running processes within the process category according to the operation command.

In the example of the present invention, by presetting how a running process may be categorized and ranked, the running processes may be displayed according to categorization and ranking when the user views the process information, thereby implementing understanding of the user for the processes currently running in the device, improving management efficiency of the running processes by the user, and further improving security of the system.

Example 7

Figure 7:
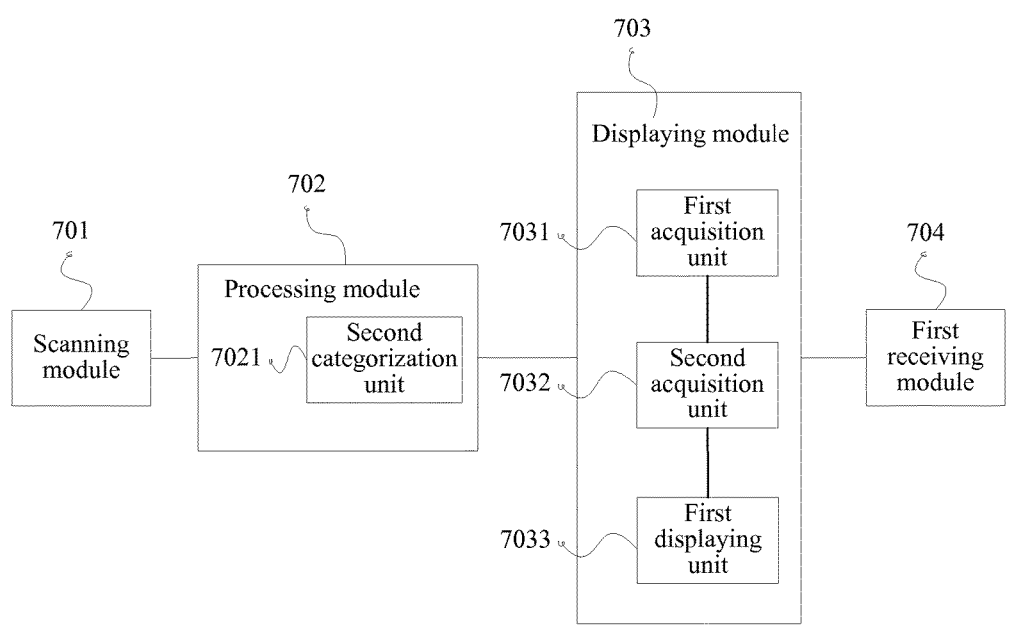
FIG. 7 is a schematic structural diagram of a device for displaying process information in accordance with some implementations of the present invention.

Referring to FIG. 7, an example of the present invention provides an apparatus for displaying process information. It should be noted that a device in the example of the present invention corresponds to the content of the method in Example 3, and the apparatus may include:

a scanning module 701, configured to scan a memory for running processes;

a processing module 702, configured to categorize the scanned running processes according to a preset process display format; and a displaying module 703, configured to display each process category after categorization and processes within each process category, and display related information of each process category and of the processes within each process category.

In a specific implementation of the present invention, the processing module 702 may include:

a second categorization unit 7021, configured to acquire process information of each running process, and obtaining corresponding security evaluation by searching a preset process information feature database according to the process information, so as to categorize the scanned running processes, wherein the step of categorizing the running processes may include classifying each running process as a safe process or a dangerous process.

The displaying module 703 may include:

a first acquisition unit 7031, configured to acquire suggestion information corresponding to each process category after categorization;

a second acquisition unit 7032, configured to acquire process information corresponding to processes within each process category after categorization, extract description information of the processes from the process information, and obtain suggestion information corresponding to the running processes by searching the preset process information feature database according to the process information; and a first displaying unit 7033, configured to display the process categories after categorization and the suggestion information corresponding to each process category, and displaying, in a process list corresponding to the process category, running processes within the process category, and suggestion information corresponding to the running processes and/or description information corresponding to the running processes.

The first acquisition unit 7031 may include:

a second acquisition sub-unit, configured to acquire an application identifier corresponding to each process category after categorization, and obtain, by searching the preset process information feature database according to the application identifier, corresponding suggestion information as suggestion information of a category corresponding to the process category.

The device may further include:

a first receiving module 704, configured to receive an operation command of a user for the process category or running processes within the process category, and executing a corresponding operation on an application corresponding to the process category or on the running processes within the process category according to the operation command.

In the example of the present invention, by presetting how a running process may be categorized and ranked, the running processes may be displayed according to categorization and ranking when the user views the process information, thereby implementing understanding of the user for the processes currently running in the device, improving management efficiency of the running processes by the user, and further improving security of the system.

Example 8

Figure 8:
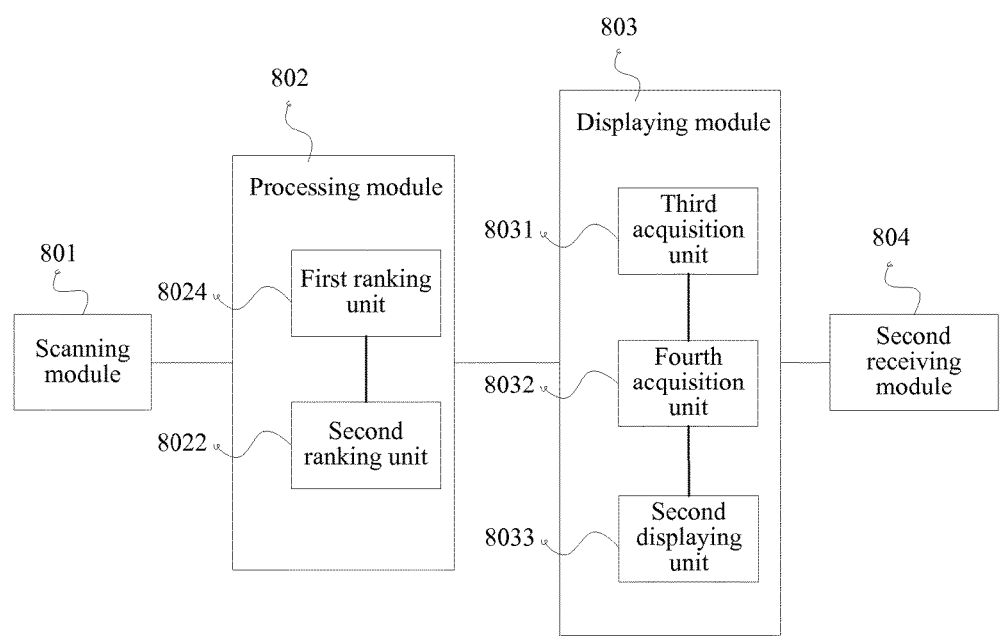
FIG. 8 is a schematic structural diagram of a device for displaying process information in accordance with some implementations of the present invention.

Referring to FIG. 8, an example of the present invention provides an apparatus for displaying process information. It should be noted that a device in the example of the present invention corresponds to the content of the method in Example 3, and the apparatus may include:

a scanning module 801, configured to scan a memory for running processes;

a processing module 802, configured to rank the scanned running processes according to a preset process display format; and a displaying module 803, configured to display ranked running processes, and display related information corresponding to the ranked running processes.

In a specific implementation manner, the processing module 802 may include:

a first ranking unit 8021, configured to acquire process information of the scanned running processes, and rank the processes according to startup time in the process information; and a second ranking unit 8022, configured to process information of the scanned running processes, and rank the processes according to the size of an occupied memory in the process information.

The displaying module 803 may include:

a third acquisition unit 8031, configured to acquire process information corresponding to each ranked running process, and extract description information corresponding to the process from the process information;

a fourth acquisition unit 8032, configured to obtain suggestion information corresponding to the running process by searching a preset process information feature database according to the process information corresponding to each ranked running process; and a second displaying unit 8033, configured to the ranked running processes and the suggestion information corresponding to the running processes and/or description information corresponding to the running processes.

The device may further include:

a second receiving module 804, configured to receive an operation command from a user for the ranked running processes, and execute a corresponding operation to the running processes according to the operation command.

In the example of the present invention, by presetting how a running process may be categorized and ranked, the running processes may be displayed according to categorization and ranking when the user views the process information, thereby implementing understanding of the user for the processes currently running in the device, improving management efficiency of the running processes by the user, and further improving security of the system.

Example 9

Figure 9:
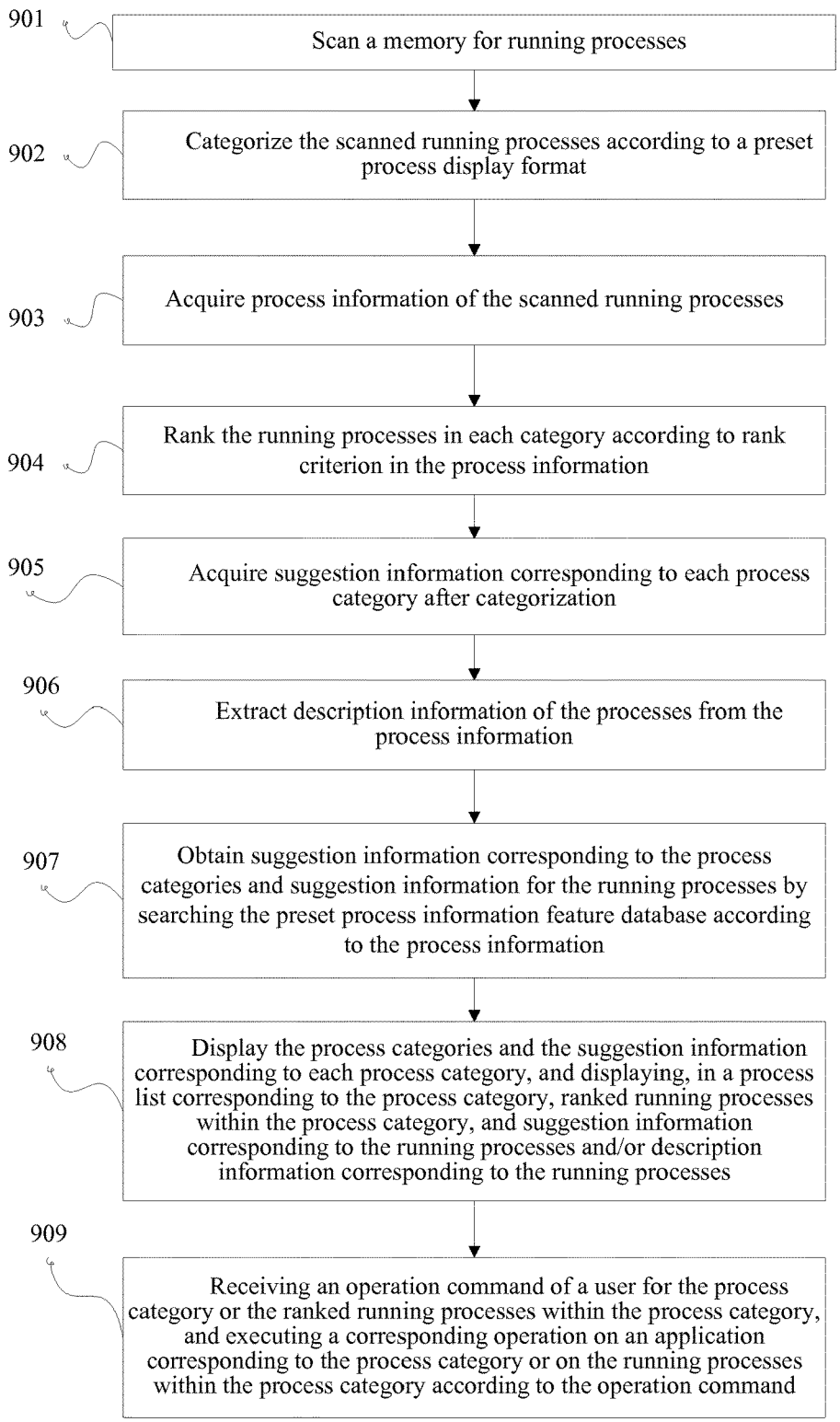
FIG. 9 is a schematic flowchart of a method for displaying process information in accordance with some implementations of the present invention.

An example of the present invention provides a method for displaying process information. Referring to FIG. 9, the embodiment includes both categorizing and ranking steps. The method may include:

901: Scan a memory for running processes;

902: Categorize the scanned running processes according to a preset process display format;

903: Acquire process information of the scanned running processes;

904: Rank the running processes in each category according to rank criterion in the process information;

905: Acquire suggestion information corresponding to each process category after categorization;

906: Extract description information of the processes from the process information;

907: Obtain suggestion information corresponding to the process categories and suggestion information for the running processes by searching the preset process information feature database according to the process information;

908: Display the process categories and the suggestion information corresponding to each process category, and displaying, in a process list corresponding to the process category, ranked running processes within the process category, and suggestion information corresponding to the running processes and/or description information corresponding to the running processes; and 909: Receiving an operation command of a user for the process category or the ranked running processes within the process category, and executing a corresponding operation on an application corresponding to the process category or on the running processes within the process category according to the operation command.

In the embodiment shown in FIG. 9, the running processes are categorized before being ranked within each category. The categorization may be based on the application identifier, as shown in the embodiment in FIG. 2, or based on the security evaluation of the running process, as shown in the embodiment in FIG. 3. However, as indicated above, the categorization may be based on other criteria.

The ranking of the running processes in each category may be conducted according to certain ranking criterion, which may be start time or the size of memory occupied by the running process, as shown in FIG. 4. However, as indicated above, the ranking may be conducted according to other criteria.

A person skilled in the art may understand that while ranking after categorization is shown in FIG. 9, categorization after ranking is also a distinct possibility and may be implemented by the current invention.

Example 10

Figure 10:
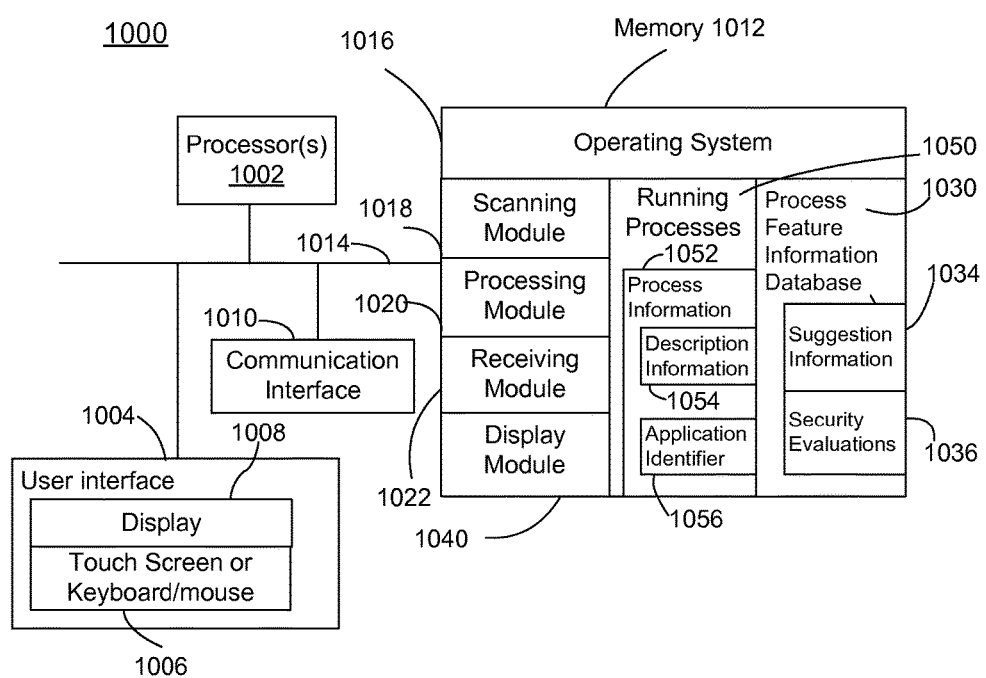
FIG. 10 is a block diagram illustrating different components of a device (e.g. a mobile terminal such as a smart phone) for displaying process information in accordance with some implementations.

Referring to FIG. 10, which is a block diagram illustrating different components of a device 1000 (e.g. a mobile terminal such as a smart phone) for displaying process information in accordance with some implementations. While certain specific features are illustrated, those skilled in the art will appreciate from the present disclosure that various other features have not been illustrated for the sake of brevity and so as not to obscure more pertinent aspects of the implementations disclosed herein. To that end, the device 1000 includes memory 1012; one or more processors 1002 for executing modules, programs and/or instructions stored in the memory 1012 and thereby performing predefined operations; one or more network or other communications interfaces 1010; and one or more communication buses 1014 for interconnecting these components.

In some implementations, the device 1000 includes a user interface 1004 comprising a display device 1008 (e.g. a screen) and one or more input devices 1006 (e.g., touch screen or keyboard/mouse). When the device 1000 is a smart phone, the touch screen is both the display device 1008 and the input device 1006.

In some implementations, the memory 1012 includes high-speed random access memory, such as DRAM, SRAM, or other random access solid state memory devices. In some implementations, memory 1012 includes non-volatile memory, such as one or more magnetic disk storage devices, optical disk storage devices, flash memory devices, or other non-volatile solid state storage devices. In some implementations, memory 1012 includes one or more storage devices remotely located from the processor(s) 1002. Memory 1012, or alternately one or more storage devices (e.g., one or more nonvolatile storage devices) within memory 1012, includes a non-transitory computer readable storage medium.

In some implementations, memory 1012 or the computer readable storage medium of memory 1012 stores the following programs, modules and data structures, or a subset thereof:

An operating system 1024 that includes procedures for handling various basic system services and for performing hardware dependent tasks.

A scanning module 1018 to scan the memory 1012 for running processes 1050.

A processing module 1020 to categorize and rank the scanned running processes 1050 according to a preset process display format;

A displaying module 1040 to display each process category after categorization and running processes within each process category, and display information related to the process category and the running processes within the process category; and/or display ranked running processes, and display related information corresponding to the ranked running processes;

A receiving module 1016 to receive an operation command of a user for the process category or running processes within the process category, and executing a corresponding operation on an application corresponding to the process category or on the running processes within the process category according to the operation command.

A preset process information feature database 1030 including a plurality of user entries and device-generated information items, such as but not limited to: suggestion information 1034 and security evaluations 1036 for process categories and running processes. Such information item may be produced by actions such as but not limited to: historical verifications, user feedbacks, analysis results, and statistical estimates. The process information feature database 1030 may include a single or a plurality of tables detailing the corresponding relationship between the information items extracted from the process information 1052 and the information items in the database. The process information feature database 1030 allows a user to sent inquiries into the database to search and obtain the various information items based on their corresponding relationships.

As indicated above, the process information 1052 is associated with the running processes 1050, which are scanned by the scanning module 1018 and categorized and ranked by the processing module 1020. The process information 1052 includes at least (1) the description information 1054 for the process categories and for the running processes, and (2) the application identifiers 1056 for the running processes. The information items in the process information 1050 may be used to search the process information feature database 1030.

It should be noted that the modules, databases, and models in the device 1000 described above in connection with FIG. 10 may be implemented on a single device (e.g. a single smart phone) or distributed among multiple devices (e.g. a smart phone and one or more computer servers) that are connected by a computer network. Although a specific hardware configuration may affect the performance of the device 1000, the implementation of the present application is not dependent on a particular hardware configuration.

FIGS. 11A-11D are exemplary screen shots of how a mobile terminal displays process categories and running processes in accordance with some implementations. While certain specific features are illustrated, those skilled in the art will appreciate from the present disclosure that various other features have not been illustrated for the sake of brevity and so as not to obscure more pertinent aspects of the implementations disclosed herein. FIGS. 11A-6E use the screen shots of a mobile terminal (e.g. a smart phone) as an example to show how the processes, categories, and commands are displayed and how a user may manage the process and process categories using the mobile terminal. The touch screen of the mobile terminal may be used both as a display device and an input device. The embodiments shown in FIGS. 11A-11D may be utilized not in the order as shown here and may be presented as alternatives based on the user's selection and the mobile terminal's settings.

FIG. 11A illustrates the display screen for categorization of the running processes based on application identifiers, as described in general in Example 2. The mobile terminal screen in FIG. 11A includes a title panel 1101, a first application panel 1103, a second application panel 1105, a third application panel 1107, and a command panel 1140. The number of application panels may vary according to the number of running processes in the memory and the results of categorization based on application identifiers. Each application panel may include the same or different information items. The presence and absence of the application panels and other panels may vary according to the specific settings of the terminal device and choices of the user. The various panels may be shown in a single screen or in a number of sequentially presented screens.

The title panel 1101 provides a summary of the contents that are displayed in the screen. Here the title panel 1101 includes "Running Process Categories" and it is clear that other phrases having similar meanings may be used. The title panel 1101 may also include indications as to how the categorization is conducted. For example, the title panel 1101 may display "Running Process Categories Based on Application."

Since in FIG. 11A, the application panels 1103, 1105, and 1107 display the same information items, only the contents of application panel 1103 are described in full. Application panel 1103 includes the application name 1120 (here "Application A"), the description information 1121 (here "A is a GPS application"), suggestion information 1122 (here "May be terminated without harm"), and a check box 1125.

The description information 1121 may include more than what is shown in FIG. 11A. As indicated in Example 2, preferably the description information 1121 is extracted from the process information. The description information 1121 may further include information items such as but not limited to: whether the application is running in the background, the start time and usage of CPU of the application, and the importance of the application to system stability, etc.

The suggestion information 1122 may be acquired through searching a process information feature database, as described in FIG. 2. The user may or may not follow the recommendations of the suggestion information and choose the corresponding commands in the command panel 1140.

The command panel 1140 presents commands 1143 the user may choose to manage the process categories—applications in FIG. 11A. The detailed effects of the commands are described in Example 2. In the embodiment shown in FIG. 11A, the user is allowed to choose multiple private contents items to ensure full protection and flexible choices.

The check boxes 1125 allow the user to conduct a particular operation according to the commands 1143 to the applications. One of more of the check boxes may be selected at one time.

After the user makes his/her selections in the command panel 1140, preferably with a one-click approach on the commands, the device proceeds to conduct the commands on the selected applications. For example, if the user selects Application B in the embodiment shown in FIG. 11A and click View, the running processes of Application B are displayed, as shown in FIG. 11B.

FIG. 11B illustrates the display screen for the running processes of Application B. The mobile terminal screen in FIG. 11B includes a title panel 1101, a first process panel 1113, a second process panel 1115, a third process panel 1117, and a command panel 1140. The number of process panels may vary according to the number of running processes associated with the application. Each process panel may include the same or different information items. The presence and absence of the process panels and other panels may vary according to the specific settings of the terminal device and choices of the user. The various panels may be shown in a single screen or in a number of sequentially presented screens.

The title panel and commands panel in FIG. 11B serve similar functions as the title panel and commands panel in FIG. 11A.

Since in FIG. 11B, the process panels 1113, 1115, and 1117 display the same information items, only the contents of process panel 1113 are described in full. Process panel 1113 includes the process name 1130 (here "Process B1"), the description information 1131 (here "B1 is an auto-start process; 20 kb"), suggestion information 1132 (here "May be terminated without harm"), and a check box 1125.

It should be noted that the description information 1131 refers to running process B1 and it also includes the size of memory occupied by B1. In FIG. 11B, the running processes are ranked by their memory occupancy and listed in such a manner. This reflects the embodiment shown in FIG. 9. However, it should be clear that neither the ranking nor the ranking criterion in FIG. 11B is required and the processes may be displayed randomly or ranked based on other criteria.

FIG. 11C illustrates the display screen for categorization of the running processes security evaluations, as described in general in Example 3. The mobile terminal screen in FIG. 11C includes a title panel 1101, a dangerous process category panel 1151, a safe process category panel 1152, and a command panel 1140. The safe process category panel 1152 includes a first application panel 1161 and a second application panel 1163, similar to what is shown in FIG. 11A. The number of application panels may vary according to the number of running processes in the memory and the results of categorization based on application identifiers. Each application panel may include the same or different information items. The presence and absence of the application panels and other panels may vary according to the specific settings of the terminal device and choices of the user. The various panels may be shown in a single screen or in a number of sequentially presented screens.

The title panel and commands panel in FIG. 11C serve similar functions as the title panel and commands panel in FIG. 11A.

The dangerous process panel 1151 includes process names 1164 ("Dangerous Processes A and B"), description information 1165 ("5 Processes, 2 applications"), and suggestion information 1166 ("Recommend to Uninstall All App"). The exact phrases and the coverage of each information item may vary. Here, since the processes have been identified as dangerous and categorized to the dangerous process group, there is less need to show which program (application) the process belongs to. Preferably, the suggestion information for such processes include termination and/or uninstallation, depending on the impact of such actions on the other programs.

If the user wants to have a more detailed understanding of the dangerous processes and applications, he/she may choose to "View" the "Dangerous Processes" and determine what actions need to be taken after the more detailed display.

The safe processes may be sub-categorized according to the application identifiers and the user may choose to take certain actions to the applications, largely similar to what is shown in FIG. 11A.

FIG. 11D illustrates the display screen for the running processes after ranking by memory occupancy. The mobile terminal screen in FIG. 11D includes a title panel 1101, a first process panel 1171, a second process panel 1173, a third process panel 1175, and a command panel 1140. The number of process panels may vary according to the number of running processes associated with the application. Each process panel may include the same or different information items. The presence and absence of the process panels and other panels may vary according to the specific settings of the terminal device and choices of the user. The various panels may be shown in a single screen or in a number of sequentially presented screens.

The title panel and commands panel in FIG. 11D serve similar functions as the title panel and commands panel in FIG. 11A, except that the commands 1143 in FIG. 11D allow the user to choose all the running processes and re-rank with start time, instead of memory occupancy.

Since in FIG. 11D, the process panels 1171, 1173, and 1175 display the same information items, only the contents of process panel 1171 are described in full. Process panel 1113 includes the process name 1180 (here "Process A1"), the memory occupancy 1182 (here "200 kb"), the start time 1183 (here "Nov. 11, 2011 0:0:18"), and suggestion information 1186 (here "May be terminated without harm"), and a check box 1125.

As indicated above, the ranking criterion may vary according to specific needs of the user and the setup in the process display program.

The order by which the foregoing examples of the present invention are presented merely reflects the convenience of description. It does not imply the preference among the examples.

Persons of ordinary skill in the art may understand that all or a part of the steps of the foregoing examples may be implemented through hardware, or may be implemented by a program instructing relevant hardware. The program may be stored in a computer readable storage medium. The storage medium may be a read-only memory, a magnetic disk, or an optical disk.

The above descriptions are merely preferred examples of the present invention, but are not intended to limit the present invention. Any modification, equivalent replacement, or improvement made without departing from the spirit and principle of the present invention should fall within the protection scope of the present invention.

While particular examples are described above, it will be understood it is not intended to limit the invention to these particular examples. On the contrary, the invention may include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the examples.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present invention. First ranking criteria and second ranking criteria are both ranking criteria, but they are not the same ranking criteria.

The terminology used in the description of the invention herein is for the purpose of describing particular examples only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "may include," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method, comprising:
at a computing device having one or more processors and memory for storing one or more programs to be executed by the one or more processors:
scanning the memory of the computing device for running processes;
categorizing the scanned running processes according to a preset process display format;
obtaining operation suggestions for the scanned running processes according to usage of applications corresponding to the scanned running processes and security evaluation of the scanned running processes, wherein the security evaluation of the scanned running processes includes (1) evaluation of impact of the scanned running processes on system security while running on the computing device and (2) evaluation of impact on system stability and safety when terminated through activation of an operation command in a process management user interface;
after categorizing the scanned running processes, displaying a plurality of process categories;
displaying, within each of one or more of the plurality of process categories, one or more respective sub-categories of said each process category, wherein each of the one or more respective sub-categories corresponds to a group of running processes, and at least one of the plurality of process categories or the respective sub-categories thereof corresponds to an application, wherein the running processes in at least one of the plurality of process categories are ranked according to respective scores that are based on the evaluation of the impact on system stability and safety when the running processes are terminated through activation of an operation command in the process management user interface;
concurrently displaying, with the plurality of process categories and the respective sub-categories thereof, (a) first information suggesting user to perform an uninstall operation of a respective application represented among the plurality of process categories and the respective sub-categories thereof based on the operation suggestion and (b) a selectable operation command for uninstalling the respective application, wherein the selectable operation command uninstalls the respective application in a one-click manner which requires one single user input selection of the selectable operation command;
receiving user selection of the selectable operation command for uninstalling the respective application represented among the plurality of process categories and the respective sub-categories thereof; and
executing uninstallation of the respective application after terminating all processes of the application.

2. The method according to claim 1, wherein the step of categorizing the scanned running processes according to the preset process display format comprises:
acquiring process information of each running process, and obtaining an application identifier in the process information to categorize the running process according to a rule of grouping running processes having the same application identifier into one category; or
acquiring process information of each running process, obtaining corresponding security evaluation by searching a preset process information feature database according to the process information, and categorizing the running process according to the corresponding security evaluation.

3. The method according to claim 2, wherein the step of categorizing the running processes according to the corresponding security evaluation comprises classifying each running process into a safe process or a dangerous process.

4. The method according to claim 1, further comprising:
ranking the scanned running processes according to the preset process display format,
wherein the step of ranking the scanned running processes according to the preset process display format further includes:
acquiring process information of the scanned running processes, and ranking the running processes according to startup time in the process information; or
acquiring process information of the scanned running processes, and ranking the running processes according to the size of an occupied memory in the process information.

5. The method according to claim 4, further comprising:
displaying each process category after categorization and the running processes within the process category, and displaying information related to each process category and the running processes within the process category, comprising:
acquiring suggestion information corresponding to the process category after categorization;
acquiring process information corresponding to the running processes within the process category after categorization, extracting description information of the running processes from the process information, and obtaining suggestion information corresponding to the running processes by searching a preset process information feature database according to the process information; and displaying the process category after categorization and the suggestion information corresponding to the process category, and displaying, in a process list corresponding to the process category, running processes within the process category, and suggestion information corresponding to the process and/or description information corresponding to the running processes.

6. The method according to claim 5, wherein the step of acquiring the suggestion information corresponding to the process category after categorization comprises:

acquiring an application identifier corresponding to the process category after categorization, and obtaining, by searching the preset process information feature database according to the application identifier, suggestion information corresponding to the process category.

7. The method according to claim 5, further comprising:

displaying the ranked running processes, and displaying the information related to the ranked running processes, comprising:

acquiring process information corresponding to each ranked running process, and extracting description information corresponding to the running process from the process information;

obtaining suggestion information corresponding to the running process by searching a preset process information feature database according to the process information corresponding to each ranked running process; and displaying the ranked running processes, and suggestion information corresponding to the running processes and/or description information corresponding to the running processes.

8. The method according to claim 7, wherein, after the step of displaying each process category after categorization and the running processes within each process category, the method further comprises:

receiving an operation command of a user for the process category or the running processes within the process category, and executing a corresponding operation on an application corresponding to the process category or the running processes within the process category according to the operation command.

9. The method according to claim 7, wherein, after the step of displaying the ranked running processes and information related to the ranked processes, the method further comprises:

receiving an operation command of a user for the ranked running processes, and executing a corresponding operation on the running processes according to the operation command.

10. A computing device, comprising:
one or more processors;
memory; and
one or more programs stored in the memory to be executed by the one or more processors, the one or more programs further including instructions for:
scanning the memory of the computing device for running processes;
categorizing the scanned running processes according to a preset process display format;
obtaining operation suggestions for the scanned running processes according to usage of applications corresponding to the scanned running processes and security evaluation of the scanned running processes, wherein the security evaluation of the scanned running processes includes (1) evaluation of impact of the scanned running processes on system security while running on the computing device and (2) evaluation of impact on system stability and safety when terminated through activation of an operation command in a process management user interface;

after categorizing the scanned running processes, displaying a plurality of process categories;

displaying, within each of one or more of the plurality of process categories, one or more respective sub-categories of said each process category, wherein each of the one or more respective sub-categories corresponds to a group of running processes, and at least one of the plurality of process categories or the respective sub-categories thereof corresponds to an application, wherein the running processes in at least one of the plurality of process categories are ranked according to respective scores that are based on the evaluation of the impact on system stability and safety when the running processes are terminated through activation of an operation command in the process management user interface;

concurrently displaying, with the plurality of process categories and the respective sub-categories thereof, (a) first information suggesting user to perform an uninstall operation of a respective application represented among the plurality of process categories and the respective sub-categories thereof based on the operation suggestion and (b) a selectable operation command for uninstalling the respective application, wherein the selectable operation command uninstalls the respective application in a one-click manner which requires one single user input selection of the selectable operation command;

receiving user selection of the selectable operation command for uninstalling the respective application represented among the plurality of process categories and the respective sub-categories thereof; and executing uninstallation of the respective application after terminating all processes of the application.

11. The device according to claim 10, wherein categorizing the scanned running processes according to the preset process display format further comprises:

acquiring process information of each running process, and obtaining an application identifier in the process information to categorize the running process according to a rule of grouping running processes having the same application identifier into one category; or acquiring process information of each running process, obtaining corresponding security evaluation by searching a preset process information feature database according to the process information, and categorizing the running process according to the corresponding security evaluation.

12. The device according to claim 11,
wherein categorizing the scanned running processes according to the corresponding security evaluation further comprises categorizing each running process into a safe process or a dangerous process.

13. The device according to claim 10, wherein the one or more programs further include instructions for ranking the scanned running processes according to the preset process display format, wherein ranking the scanned running processes according to the preset process display format further comprises:

acquiring process information of the scanned running processes, and ranking the running processes according to startup time in the process information; and acquiring process information of the scanned running processes, and ranking the running processes according to the size of an occupied memory in the process information.

14. The device according to claim 13, wherein the one or more programs further include instructions for displaying each process category after categorization and the running processes within the process category, and displaying information related to each process category and the running processes within the process category, comprising:

acquiring suggestion information corresponding to the process category after categorization;

acquiring process information corresponding to the running processes within the process category after categorization, extract description information of the running processes from the process information, and obtain suggestion information corresponding to the running processes by searching a preset process information feature database according to the process information; and displaying the process category after categorization and the suggestion information corresponding to the process category, and display, in a process list corresponding to the process category, running processes within the process category, and suggestion information corresponding to the process and/or description information corresponding to the running processes.

15. The device according to claim 14, wherein acquiring the suggestion information corresponding to the process category after categorization comprises:

acquiring an application identifier corresponding to the process category after categorization; and obtaining, by searching the preset process information feature database according to the application identifier, suggestion information corresponding to the process category.

16. The device according to claim 14, wherein the one or more programs further include instructions for displaying the ranked running processes, and displaying the information related to the ranked running processes, comprising:

acquiring process information corresponding to each ranked running process, and extract description information corresponding to the running process from the process information;

obtaining suggestion information corresponding to the running process by searching a preset process information feature database according to the process information corresponding to each ranked running process; and displaying the ranked running processes, and suggestion information corresponding to the running processes and/or description information corresponding to the running processes.

17. The device according to claim 16, wherein the one or more programs further include instructions for:

receiving an operation command of a user for the process category or the running processes within the process category, and execute a corresponding operation on an application corresponding to the process category or the running processes within the process category according to the operation command.

18. The device according to claim 16, wherein the one or more programs further include instructions for:

receiving an operation command of a user for the ranked running processes, and execute a corresponding operation on the running processes according to the operation command.

19. A non-transitory computer readable storage medium storing one or more instructions, which, when executed by a computing device, cause the computing device to:

scan the memory of the computing device for running processes;

categorize the scanned running processes according to a preset process display format;

obtain operation suggestions for the scanned running processes according to usage of applications corresponding to the scanned running processes and security evaluation of the scanned running processes, wherein the security evaluation of the scanned running processes includes (1) evaluation of impact of the scanned running processes on system security while running on the computing device and (2) evaluation of impact on system stability and safety when terminated through activation of an operation command in a process management user interface;

after categorizing the scanned running processes, display a plurality of process categories;

display, within each of one or more of the plurality of process categories, one or more respective sub-categories of said each process category, wherein each of the one or more respective sub-categories corresponds to a group of running processes, and at least one of the plurality of process categories or the respective sub-categories thereof corresponds to an application, wherein the running processes in at least one of the plurality of process categories are ranked according to respective scores that are based on the evaluation of the impact on system stability and safety when the running processes are terminated through activation of an operation command in the process management user interface;

concurrently display, with the plurality of process categories and the respective sub-categories thereof, (a) first information suggesting user to perform an uninstall operation of a respective application represented among the plurality of process categories and the respective sub-categories thereof based on the operation suggestion and (b) a selectable operation command for uninstalling the respective application, wherein the selectable operation command uninstalls the respective application in a one-click manner which requires one single user input selection of the selectable operation command;

receive user selection of the selectable operation command for uninstalling the respective application represented among the plurality of process categories and the respective sub-categories thereof; and execute uninstallation of the respective application after terminating all processes of the application.

* * * * *